(12) United States Patent
Watanabe et al.

(10) Patent No.: US 7,151,848 B1
(45) Date of Patent: Dec. 19, 2006

(54) IMAGE PROCESSING APPARATUS FOR ROBOT

(75) Inventors: Atsushi Watanabe, Tokyo (JP); Ryuichi Hara, Fujiyoshida (JP); Taro Arimatsu, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 09/429,920

(22) Filed: Oct. 29, 1999

(30) Foreign Application Priority Data

Oct. 30, 1998 (JP) .................................. 10-325919

(51) Int. Cl.
*G06K 9/00* (2006.01)
(52) U.S. Cl. ...................................... 382/141; 700/245
(58) Field of Classification Search ................ 382/141, 382/152–153; 318/568.13, 568.2; 700/245
See application file for complete search history.

(56) References Cited

U.S. PATENT DOCUMENTS

| | | | | | |
|---|---|---|---|---|---|
| 4,812,614 | A | * | 3/1989 | Wang et al. | ............ 219/124.34 |
| 5,467,003 | A | * | 11/1995 | Kosaka et al. | ......... 318/568.13 |
| 5,572,102 | A | * | 11/1996 | Goodfellow et al. | ... 318/568.13 |
| 5,705,906 | A | * | 1/1998 | Tanabe et al. | ............... 318/567 |
| 5,987,591 | A | * | 11/1999 | Jyumonji | .................... 700/259 |
| 6,148,100 | A | * | 11/2000 | Anderson et al. | ........... 382/153 |
| 6,167,328 | A | * | 12/2000 | Takaoka et al. | ......... 318/568.1 |
| 6,362,813 | B1 | * | 3/2002 | Worn et al. | .................. 345/169 |

FOREIGN PATENT DOCUMENTS

EP 05066825 3/1993
EP 0812662 A1 12/1997

* cited by examiner

*Primary Examiner*—Jingge Wu
*Assistant Examiner*—Tom Y. Lu
(74) *Attorney, Agent, or Firm*—Staas & Halsey LLP

(57) ABSTRACT

A robot control unit 42 and an image processing control unit (control unit of the image processing apparatus) 43 are incorporated into a robot controller 40. A camera CM is connected to the image processing control unit 43. A main body 1 of a robot is connected to the robot control unit 42 through an amplifier 41. A portable robot teaching pendant 80 connected to the robot control unit 42 is provided with a monitor display, and functions also as a teaching pendant of the image processing apparatus. Therefore, by using the teaching pendant 80, manipulation of image processing, and issuing of an instruction to a program for processing an image can be performed. Furthermore, an image obtained by a camera CM, and information relevant to the manipulation of the image processing apparatus such as an operation menu, etc. can be displayed on the monitor display. Therefore, an operator can efficiently perform all operations relevant to the robot, the camera, processing an image, etc. while watching a monitor screen.

6 Claims, 12 Drawing Sheets

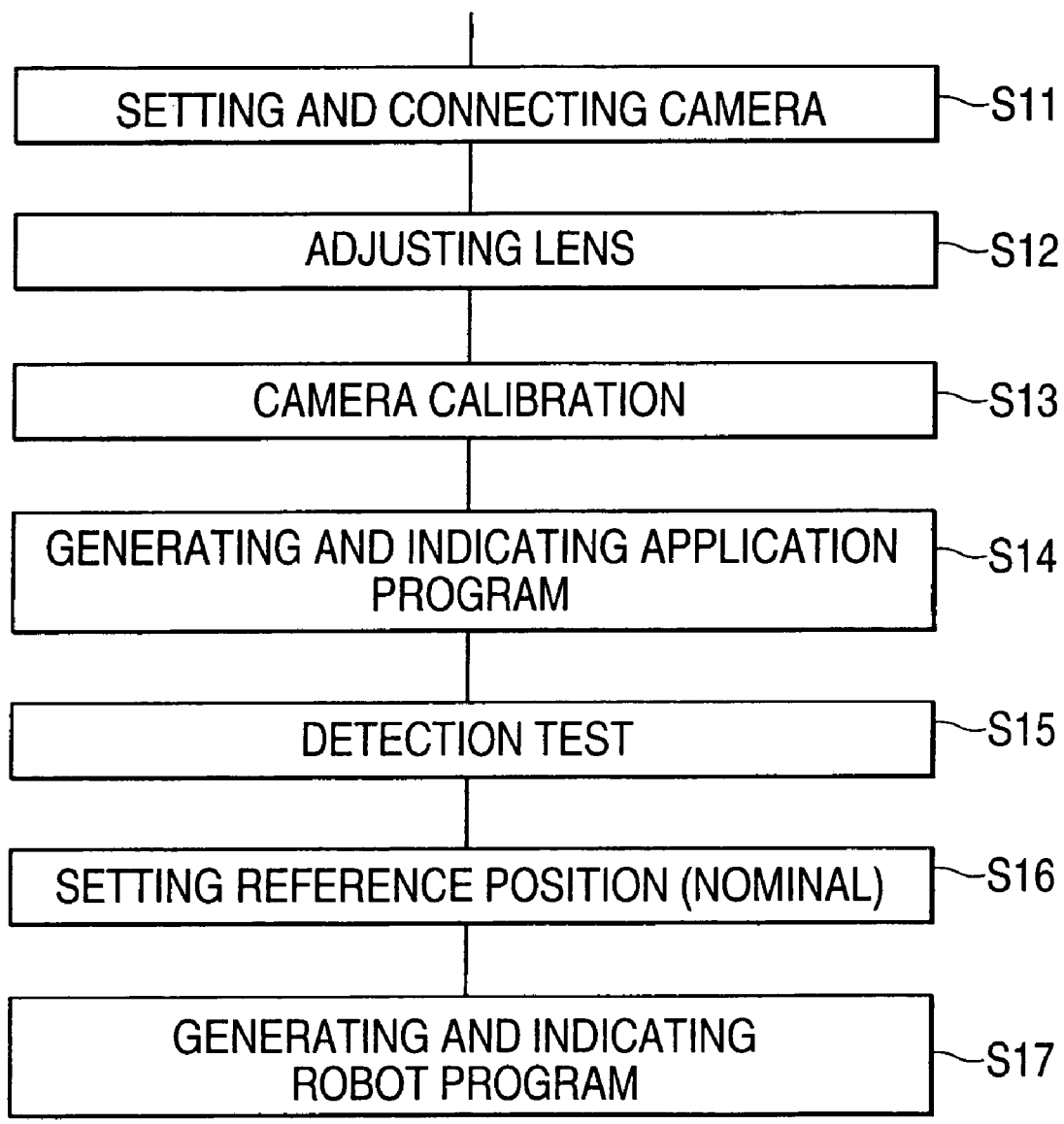

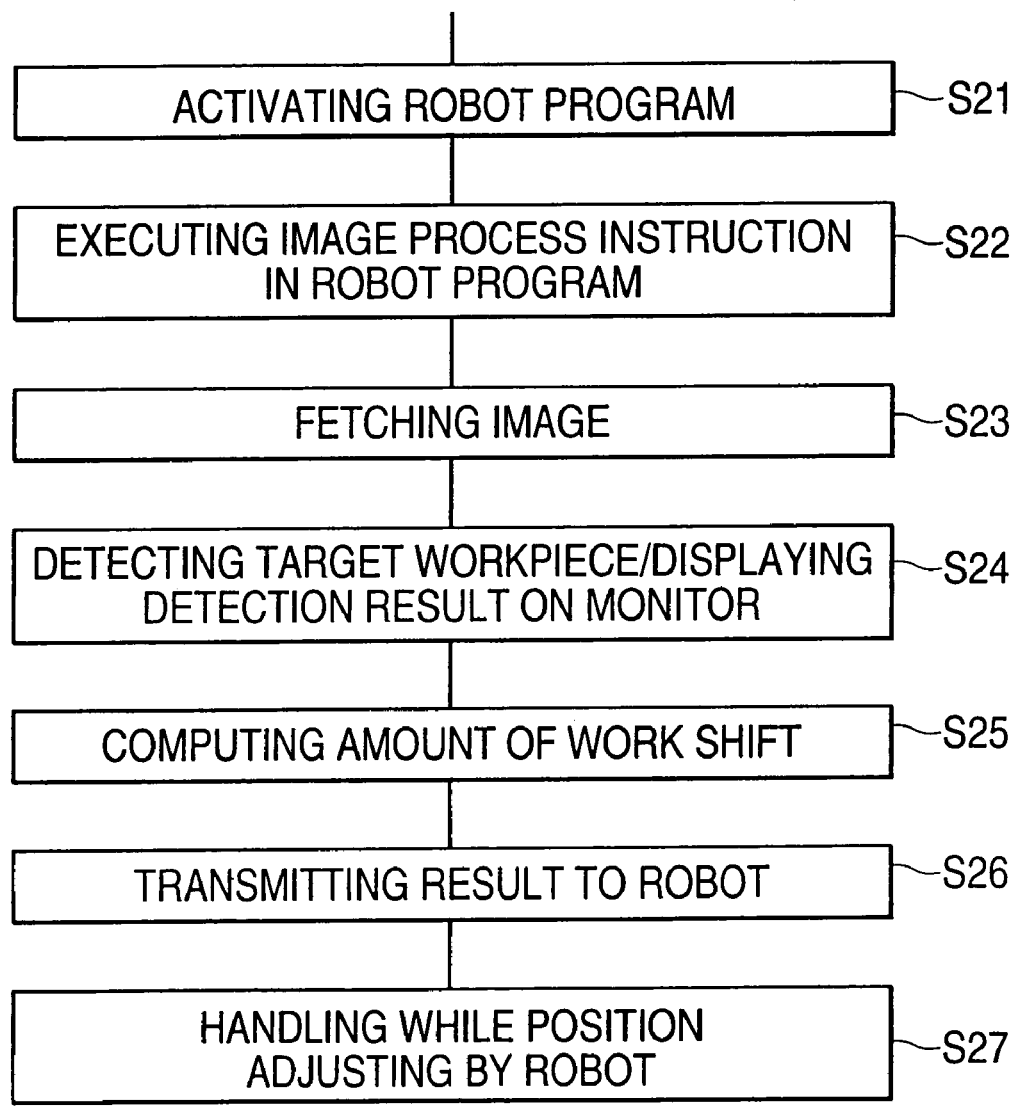

IMAGE PROCESSING APPARATUS FOR ROBOT

BACKGROUND OF THE INVENTION

1. Field of the Invention

The present invention relates to an image processing apparatus for a robot for locating and checking an object by functioning as a visual unit of a robot, and more specifically to a technology for improving the manipulation of the image processing apparatus for a robot.

2. Description of the Prior Art

A robot is used in combination with an image processing apparatus provided with a camera for taking a photograph of a workpiece, etc. in many cases. The image processing apparatus used in combination with a robot (hereinafter referred to as an image processing apparatus for a robot) can be embodied as described below in (1) through (4).

(1) As shown in FIG. 1, the image processing apparatus (main body section) is connected to a robot controller for controlling a robot (main body), a TV monitor, a camera, and a teaching device (a teaching pendant) for image processing apparatus. A control unit for manipulating image processing is independent of the control unit for controlling a robot, and both are connected through a communications unit.

The teaching pendant for the image processing apparatus is provided independent of a portable teaching pendant (robot teaching pendant) connected to the robot controller, and is used for manipulating the image processing apparatus and teaching a program for processing an image, etc. The information about the image obtained by the camera, the processed image, the information on the manipulation of the image processing apparatus such as an operation menu, etc. are displayed on a TV monitor independent of the robot teaching pendant and the teaching pendant for the image processing apparatus.

(2) As shown in FIG. 2, a desktop-type personal computer is used as a main body section of the image processing apparatus. The personal computer used as the image processing apparatus is connected to the robot controller for controlling a robot (main body) and the camera. The control unit of the personal computer is provided as independent of the control unit of the robot controller, and these control units are connected to each other through the communications unit.

A keyboard and a mouse provided for the personal computer are used as a teaching pendant for the image processing apparatus, and manipulation for processing an image and teaching of a program are carried out through this teaching pendant. The information about the image obtained by the camera, the processed image, the information on manipulation of the image processing apparatus such as an operation menu, etc. are displayed on the monitor display (CRT, LCD, etc.) provided for the personal computer.

(3) As shown in FIG. 3, the robot controller and the main body section of the image processing apparatus are used as a built-in apparatus. The TV monitor, the camera, the teaching pendant for the image processing apparatus, and the robot teaching pendant are connected to the built-in apparatus. The control unit for controlling a robot and the control unit for manipulating image processing are shared (connected through a bus).

The teaching pendant for the image processing apparatus is provided independent of the portable robot teaching pendant, and operations for processing an image or the like and teaching a program for processing an image are carried out through this teaching pendant. The information about the image obtained by the camera, the processed image, the information on manipulation of the image processing apparatus such as an operation menu, etc. are displayed on the TV monitor independent of the robot teaching pendant or the teaching pendant for the image processing apparatus.

(4) Described above are typical embodiments of the image processing apparatus for a robot. In addition, as disclosed in Japanese Patent Application Laid-Open NO. 5-66825, a TV monitor is detachably mounted on the teaching pendant for the image processing apparatus. The teaching pendant for the image processing apparatus is provided independent of the robot teaching pendant.

Incidentally, manipulation of the image processing apparatus for a robot is often carried out while frequently referring to image information. Therefore, it is desired that an operation menu and the image information are displayed near the operator. Otherwise, the operator has to frequently switch the sight, thereby lowering the operability.

Furthermore, since the image processing apparatus is used for a robot, target workpiece and a camera are positioned beside the robot. As a result, it is often necessary to conduct a detection test by shifting the position of target workpiece in the field of the vision of the camera, or to adjust the focalization and the stop of the lens of the camera. Accordingly, to efficiently perform these operations, it is desired that means for manipulating an image processing apparatus is of a portable type.

Furthermore, since the image processing apparatus is used for a robot, the manipulation of the robot and the manipulation of the image processing apparatus are alternately performed in most cases. Therefore, it is desired that the robot teaching pendant can also manipulate the image processing apparatus. Otherwise, an operator has to hold one teaching pendant at one time and the other teaching pendant at the other time or has to move from one place to the other place each time the manipulation is switched from the robot to the image processing apparatus and vice versa.

Considering these demerits, the conventional technology described above in (1) through (4) has a problem in easiness in manipulation. That is, the operator who carries a portable robot teaching pendant and is near a robot (main body) has the difficulty in performing all manipulations of the image processing apparatus. It is desired that, by transforming the above described conventional technology described above in (3), the manipulations relevant to image processing can be performed through a robot teaching pendant by, for example, using a robot teaching pendant also as a teaching pendant for the image processing apparatus. In this case, a detachable TV monitor is required, and the problem that additional handling and cost are required remains.

OBJECTS AND SUMMARY OF THE INVENTION

Under the above described current situation, the present invention aims at solving the problems of the conventional technology by improving manipulation of the image processing apparatus for a robot.

To attain the above described purpose, the present invention provides an image processing apparatus manipulating menu, and a display unit for displaying monitor image information, on a portable teaching pendant for the image processing apparatus for performing the manipulations relevant to processing an image.

According to a first embodiment of the image processing apparatus for a robot of the present invention, the image processing apparatus is built in a robot controller, and has a portable teaching pendant connected thereto.

The image processing apparatus includes: a unit for fetching an image from a camera; memory for storing image data from the camera or intermediate image data obtained in a stage of image processing; and a unit for converting image data from the camera, the image data from the camera stored in the memory, or the intermediate image data into a gray scale or a color scale.

Then, the portable teaching pendant includes a display unit and a unit for manipulating image processing. The display unit displays an image and indication for manipulation of image processing, simultaneously, or in a switching mode or superposition mode.

According to a second embodiment of the image processing apparatus for a robot of the present invention, the image processing apparatus is designed independent of the robot teaching pendant, and has a portable teaching pendant connected thereto.

The image processing apparatus includes: a unit for fetching an image from a camera; memory for storing image data from the camera or intermediate image data obtained in a stage of image processing; and a unit for converting image data from the camera, the image data from the camera stored in the memory, or the intermediate image data into a gray scale or a color scale.

Then, the portable teaching pendant includes a display unit and a unit for manipulating image processing. The display unit displays an image and indication for manipulation of image processing, simultaneously, or in a switching mode or superposition mode.

Preferably, the above described first and second embodiments include a unit for specifying an image processing for an image displayed on the display unit by overlapping geometric graphics with the image and displaying them together according to the operation procedure of the above described image processing.

According to a third embodiment of the image processing apparatus for a robot of the present invention, the image processing apparatus is built in a robot controller, and includes: a unit for fetching an image from a camera; memory for storing image data from the camera or intermediate image data obtained in a stage of image processing; and a unit for converting image data from the camera, the image data from the camera stored in the memory, or the intermediate image data into a gray scale or a color scale. The robot controller has a portable teaching pendant connected thereto through a cable. Furthermore, the teaching pendant includes: a unit for generating or editing a program of the robot; a unit for manipulating the robot; and a display unit. This teaching pendant can display on the display unit an image converted into the gray scale.

Furthermore, the teaching pendant includes a unit for manipulating image processing. The display unit displays indication for use in generating or editing a program of a robot and indication for manipulation of image processing, in addition to an image, simultaneously, or in a switching mode or superposition mode.

Preferably, the third embodiment according to the present invention includes a unit for specifying an image processing for an image displayed on the display unit by overlapping geometric graphics with the image and displaying them together by means of a manipulation unit for the image processing.

In the first through the third embodiments of the present invention, a part of the manipulation unit of the teaching pendant can be designed as a touch panel. In addition, it is desired that the apparatus further includes a unit for incorporating an instruction for image processing into a robot program.

BRIEF DESCRIPTION OF THE DRAWINGS

The foregoing and other objects and features of the invention will become apparent from the following description of preferred embodiments of the invention with reference to the accompanying drawings, in which:

FIG. 13 is a flowchart of the setup operation for starting actual work for the image processing control apparatus shown in FIGS. 4 to 6; and FIG. 14 is a flowchart of the operation of actual work of the image processing control apparatus shown in FIGS. 4 to 6.

DETAILED DESCRIPTION OF THE PREFERRED EMBODIMENTS

The first, second, and third embodiments of the image processing apparatus for a robot according to the present invention will be described below by referring to the schematic diagrams of FIG. 4 to FIG. 6.

Figure 4:
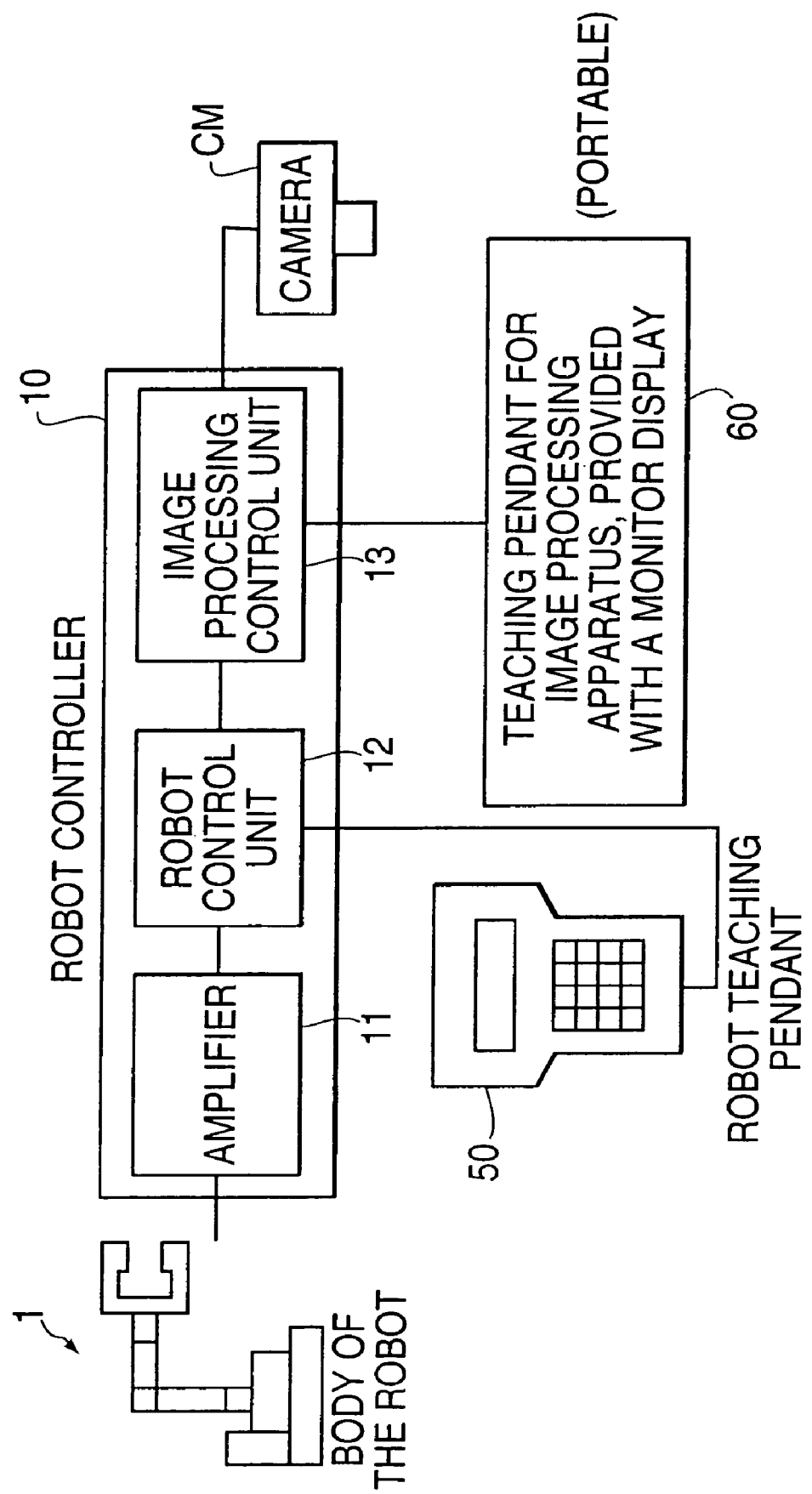
FIG. 4 is a schematic diagram of a first embodiment of the image processing apparatus for a robot according to the present invention.

According to the first embodiment shown in FIG. 4, a robot control unit 12 and an image processing control unit (control unit of the image processing apparatus) 13 are incorporated into a robot controller 10. A main body 1 of a robot is connected to a robot control unit 12 through an amplifier 11.

A portable teaching pendant (teaching console panel) 60 provided with a camera CM and a monitor display is connected to the image processing control unit 13. The teaching pendant 60 is provided independent of a robot teaching pendant (robot teaching console panel) 50 connected to the robot control unit 12. The teaching pendant 60 is used for manipulating image processing, teaching of an image processing program, etc. In addition, an image obtained by a camera, a processed image, and information relevant to the manipulations of the image processing apparatus such as an operation menu are displayed on the monitor display provided on the teaching pendant 60.

Figure 5:
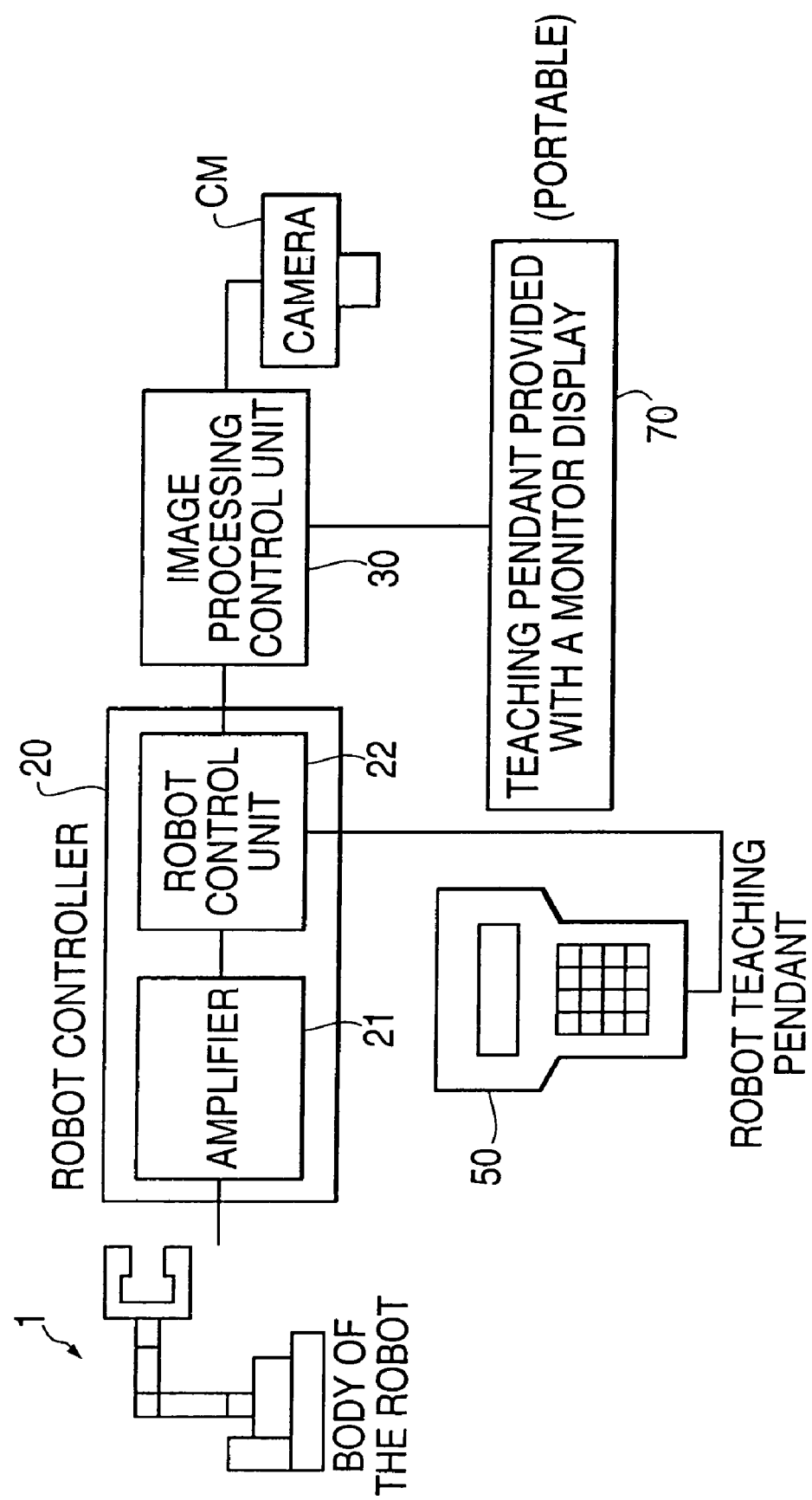
FIG. 5 is a schematic diagram of a second embodiment of the image processing apparatus for a robot according to the present invention.
Figure 6:
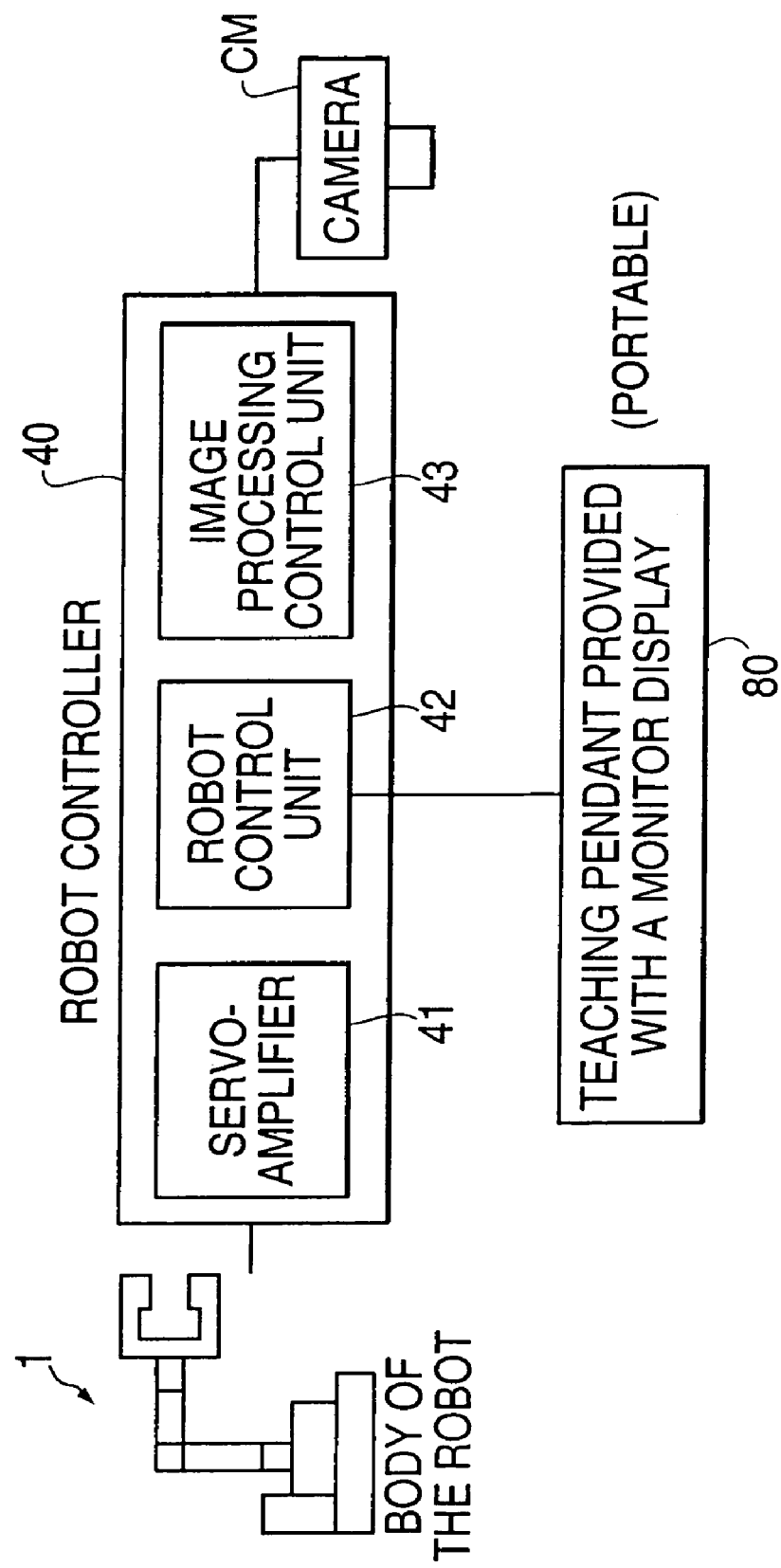
FIG. 6 is a schematic diagram of a third embodiment of the image processing apparatus for a robot according to the present invention.

On the other hand, according to the second embodiment shown in FIG. 5, a robot controller 20 is designed independent of an image processing control unit (control unit of the image processing apparatus) 30. The main body 1 of the robot is connected to a robot control unit 22 through an amplifier 21 in the robot controller 20.

A portable teaching pendant (teaching console panel) 70 provided with a camera CM and a monitor display is connected to the image processing control unit 30. The teaching pendant 70 is provided independent of a robot teaching pendant 50 to be connected to the robot control unit 22. The teaching pendant 70 is used for manipulation for image processing, teaching of an image processing program, etc. In addition, an image obtained by a camera, a processed image, and information relevant to the manipulation of the image processing apparatus such as an operation menu, etc. is displayed on the monitor display provided on the teaching pendant 70. Furthermore, according to the third embodiment shown in FIG. 6, a robot control unit 42 and an image processing control unit (control unit of the image processing apparatus) 43 are incorporated into a robot controller 40. A camera CM is connected to the image processing control unit 43. The main body 1 of the robot is connected to the robot control unit 42 through an amplifier 41.

A portable teaching pendant (teaching console panel) 80 provided with a monitor display is connected to the robot control unit 42. The teaching pendant 80 serves both as a robot teaching pendant and a teaching pendant for the image processing apparatus.

That is, the teaching pendant 80 corresponds to a combination of the portable robot teaching pendant 50 with the teaching pendant 70 shown in FIG. 5 (second embodiment), and is used for manipulation of image processing and teaching of an image processing program, in addition to operation for a normal teaching to a robot. Furthermore, an image obtained by a camera, a processed image, and information relevant to manipulation of the image processing apparatus such as an operation menu, etc. can be displayed on the monitor display provided on the teaching pendant 80.

Figure 7:
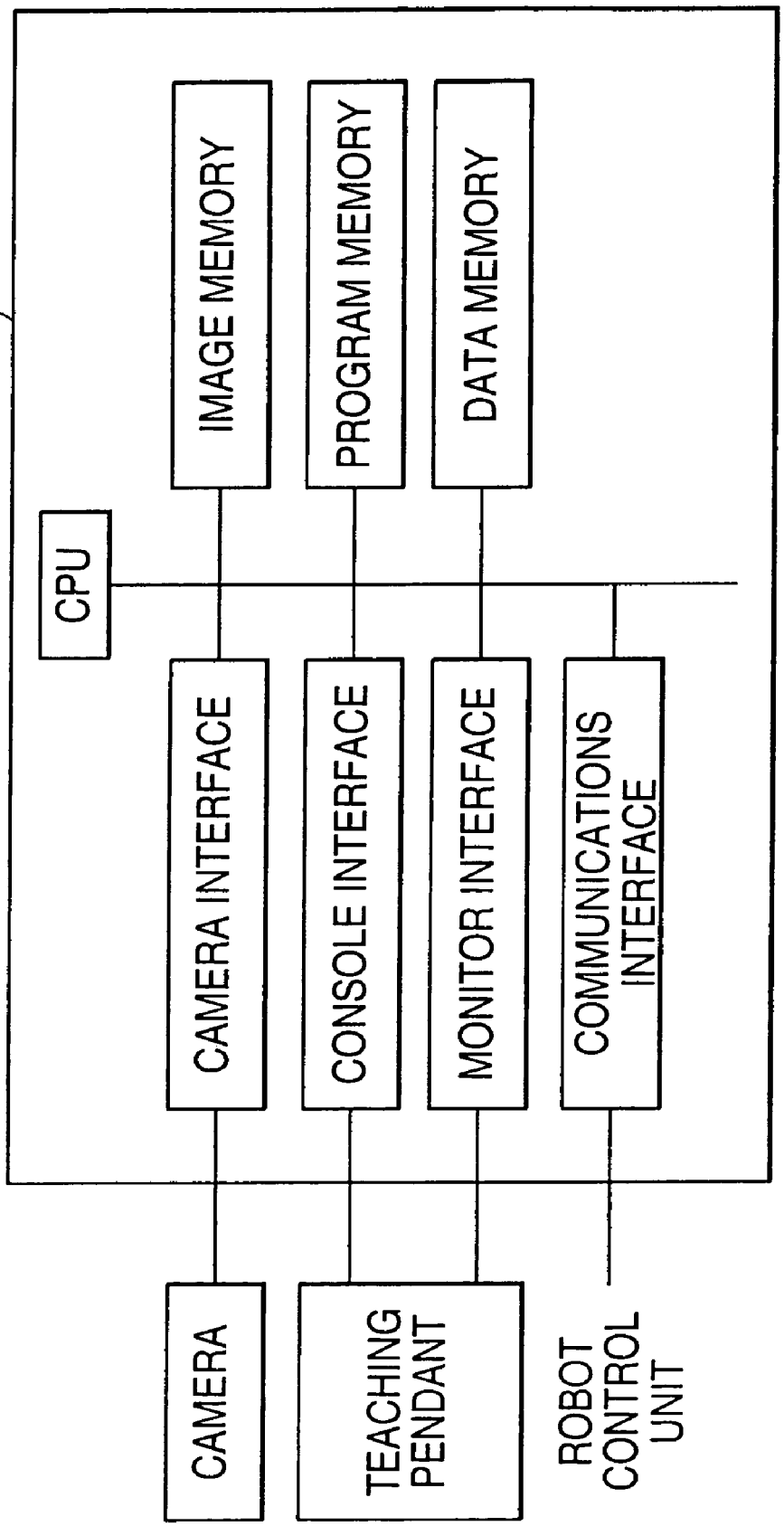
FIG. 7 is a block diagram of the principal part of the image processing control apparatus shown in FIGS. 4 to 6.

Next, the image processing control units 13, 30, and 43 according to the above described embodiments (FIGS. 4 through 6) will be described below by referring to the block diagram of the principal part shown in FIG. 7.

Each of the image processing control units 13, 30, and 43 comprises a central processing unit (CPU) to which a camera interface, a console interface, a monitor interface, a communications interface, image memory, program memory, and data memory are connected through a bus.

A camera for taking a photograph of an object sequentially transmitted to, for example, the production line, is connected to the camera interface, and an image of the object processed as a gray scale image is stored in the image memory. The CPU processes the image stored in the memory, identifies an object, and detects the position and the posture of the object.

A portable teaching pendant of the image processing apparatus is connected to the console interface. A teaching pendant and a monitor display (for example, a TV monitor, an LCD) are connected to the monitor interface so that an image stored in the image memory, a picture captured by a camera, etc. can be displayed on them.

A robot control unit is connected to the communications interface. The control program which the CPU uses in controlling the image processing apparatus is stored in the program memory. An image analysis algorithm is also contained in the control program. Data memory is made of a non-volatile RAM storing various data such as various setting parameter, etc. of a user-generated application program and image analyzing method.

A first feature of the image processing apparatus for a robot according to the present invention is to use a portable teaching pendant as a console of the image processing apparatus, and display image information outputted from the monitor interface on the monitor screen provided there, which is described later. The image output from the monitor interface is also connected to the TV monitor, in addition to the teaching pendant. This is to display a result of an image processing, etc. on a relatively large monitor screen for a large number of users during operation at a manufacturing line. Obviously, the TV monitor is not an essential component, so that the result of an image processing an image may be displayed on a monitor display provided on the teaching pendant during operation at a production line.

Furthermore, a second feature of the image processing apparatus for a robot according to the present invention is, as understood from in FIG. 4 (first embodiment), that the control unit of the image processing apparatus does not have any exclusive image processor. This is because a gray scale image processing can be carried out by the CPU, without using any exclusive processor, thanks to progress in hardware in recent years. Of course, it is obvious that an exclusive image processor can be provided to process an image.

The configuration of the teaching pendant 60 connected to the image processing control unit 13 shown in FIG. 4 (first embodiment) will be described below by referring to FIG. 8.

Figure 8:
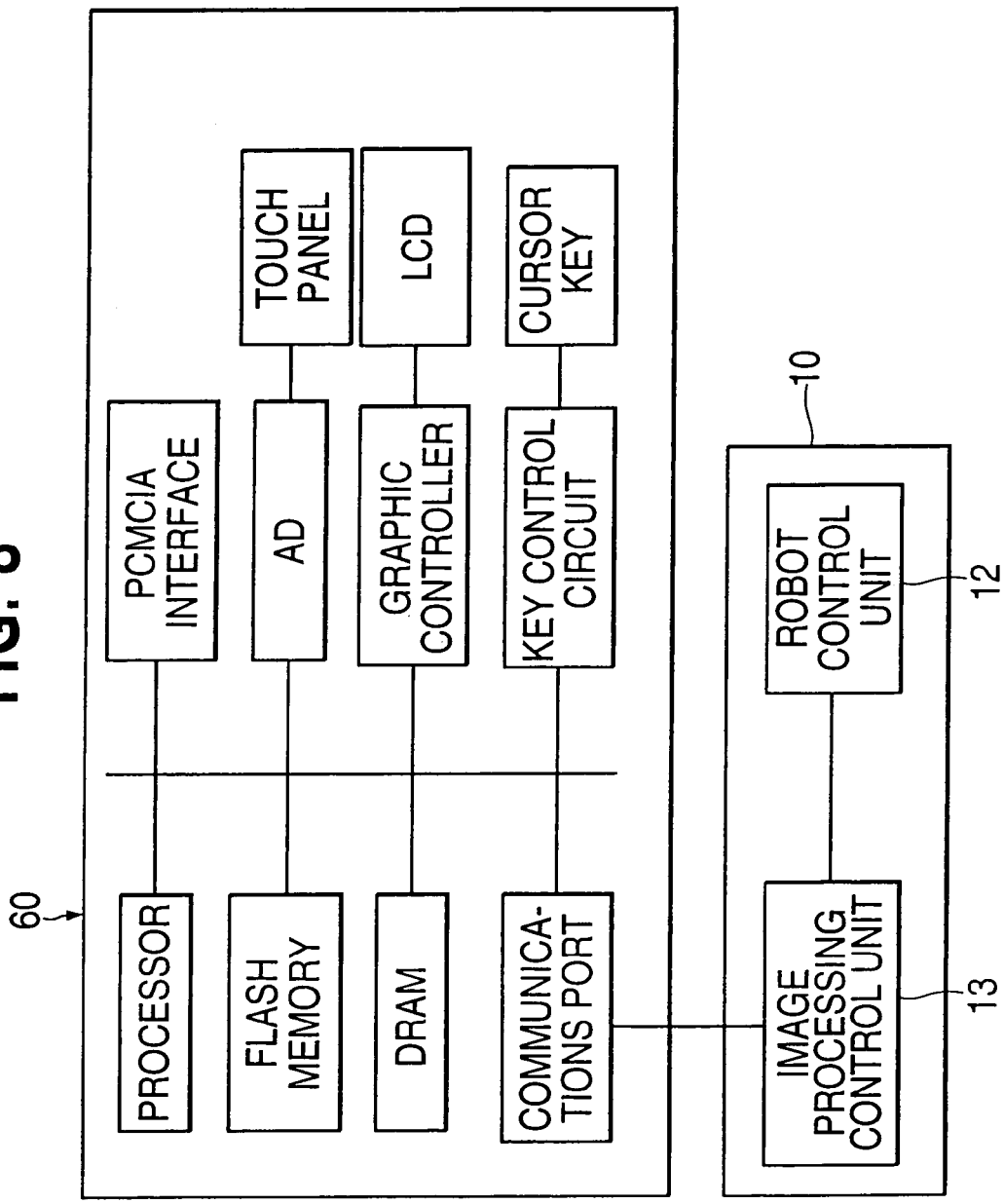
FIG. 8 is a block diagram of the principal part of the teaching pendant connected to the image processing apparatus shown in FIGS. 4 and 5.

In FIG. 8, the teaching pendant 60 is connected to the image processing control unit 13 in the robot controller 10. The image processing control unit 13 is, as described above, incorporated into the robot controller 10, and is built in the robot controller 10 with the robot control unit 12 for controlling the main body 1 of the robot.

In the teaching pendant 60, a processor, flash memory, a DRAM (direct memory access controller), a communications port, a PCMCIA (Personal Computer Memory Card International Association) interface, an AD (analog/digital) converter to which a touch panel is connected, a graphic controller to which a liquid crystal display (LCD) is connected, and a key control circuit to which a cursor key, the numerical keys, etc. for use in processing an image are connected through a bus.

The flash memory stores an operating system program for the processor. For example, an operating system program (for example, 'Windows CE', of Microsoft, etc.) for supporting a graphic user interface is stored. This program converts a program, data on parameters, etc., relevant to processing an image, into the expression format of visual diagrams and graphics so that they can be displayed on the liquid crystal display as a display unit.

The DRAM is used as work memory such as a temporary storage, etc. of data for use in performing arithmetic operations. The communications port connects, as described above, the image processing control unit 13 or 43 with the teaching pendant 60 or 80 through a cable.

The PCMCIA interface reads a program relevant to an image processing stored in the memory card and data on various parameters and writes data to be stored in the DRAM in the memory card.

The touch panel is arranged on the liquid crystal display in piles, so that touching an area for one of the items displayed on the liquid crystal display will enable a command for the item to be inputted. Such an inputting method has been well-known.

The key control circuit comprises a processor or a DMAC (Direct Memory Access Controller), and processes signals from various key, etc. In addition, the processor may directly process a key.

The configuration of the teaching pendant 70 connected to the image processing control unit 30 shown in FIG. 5 (second embodiment) is the same as the configuration of the teaching pendant 60 shown in FIG. 8. However, although the teaching pendant 70 shown in FIG. 8 (first embodiment) is connected to the image processing control unit 13 built in the robot controller, the teaching pendant 70 shown in FIG. 5 is connected to the image processing control unit 30 provided externally to the robot controller 20 as described above.

The configurations of the robot control unit 42 shown in FIG. 6 (third embodiment), and the teaching pendant 80 to be connected to the robot control unit 42 will be described below by referring to FIG. 9.

Figure 9:
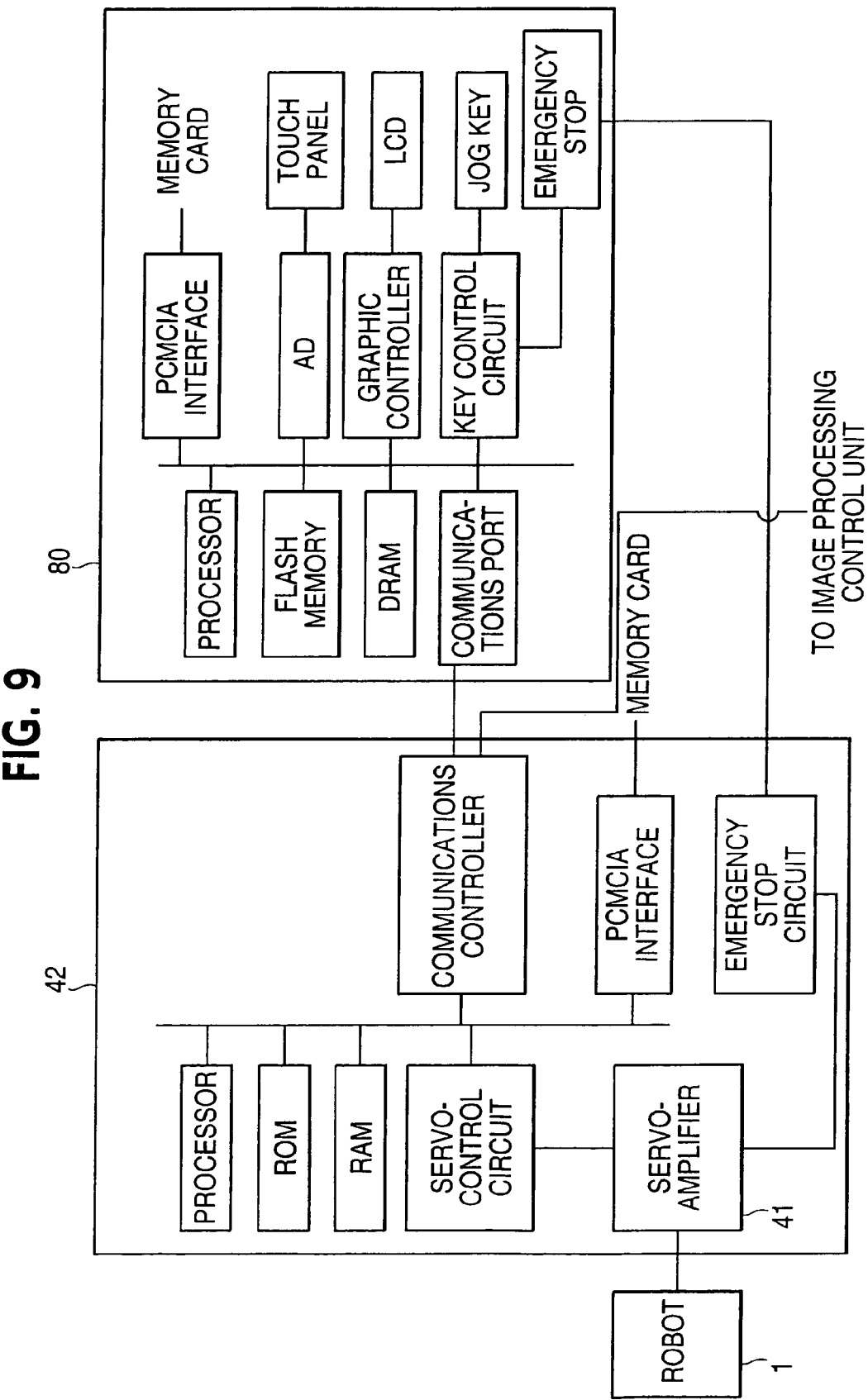
FIG. 9 is a block diagram of the principal part of the image processing apparatus shown in FIG. 6.

In FIG. 9, the teaching pendant 80 is connected to the robot control unit 42 of the robot controller 40 for controlling the main body 1 of the robot through a cable and a signal line. The teaching pendant 80 is a portable teaching pendant provided with a monitor display as described above, and serves both functions as a robot teaching pendant and a teaching pendant for the image processing apparatus. The teaching pendant 80 is connected to the robot control unit 42 through a cable and a signal line.

The robot control unit 42 comprises a processor, ROM for storing a system program, etc. for controlling the processor, RAM used to store an instructing operation program and various parameters, etc., and used to temporarily store data in performing arithmetic operations, etc., a servo-control circuit for drive controlling the servo-motor of each axis of the main body 1 of the robot, a communications controller for controlling the communications with the teaching pendant 80, a PCMCIA interface, each connected to processor through a bus.

The servo-amplifier 41 of each axis is connected to the servo-control circuit. A servo motor of each axis of the main body 1 of the robot is connected to the servo-amplifier. In addition, the servo-amplifier 41 is connected with an emergency stop circuit so that the operation of the robot can be stopped by turning off the power supply to the servo-amplifier when an emergency stop signal is transmitted from a manual console panel.

In addition, the PCMCIA interface is used for reading information from a memory card, and the processor reads information on an operation program, etc. of a robot stored in the memory card through the PCMCIA interface. The read information is stored in RAM.

The teaching pendant 80 and the image processing control unit 43 (refer to FIG. 6) are connected to the communication controller through a cable. The robot control unit receives an instruction and data from the teaching pendant 80 and the image processing control unit 43, and transmits robot controlling data, image processing data, etc. to the teaching pendant 80.

Then, the processor reads robot controlling data stored in the RAM, and, if move command is issued, then the processor outputs the move command to the servo-control circuit based on the instructing operation program. The servo-control circuit carries out feed back control of position, speed and electric current to control the servo-amplifier 41 to drive the servo-motor of each axis of the main body 1 of the robot, thereby operating the robot.

In the teaching pendant 80, a processor, flash memory, a DRAM, a communications port, a PCMCIA interface, an AD (analog/digital) converter to which a touch panel is connected, a graphic controller to which a liquid crystal display (LCD) is connected, and a key control circuit to which a jog key, an emergency stop key, a cursor key, numerical keys, etc. for use in processing an image are connected with one another through a bus.

The flash memory stores an operating system program for the processor. For example, an operating system program (for example, 'Windows CE', etc. of Microsoft, etc.) for supporting a graphic user interface which can be configured in, for example, a semiconductor memory is stored. This program converts a robot operation program, an image processing program, data on parameters, etc. into the expression format of visual diagrams and graphics so that they can be displayed on the liquid crystal display as a display unit.

The DRAM is used as work memory for a temporary storage, etc. of data for use in performing arithmetic operations. The teaching pendant 80 may also be designed such that it can generate control data for a robot and data relevant to an image processing, read an operation program and parameter stored in the RAM of the robot control unit, store the control data and parameter, and modify the control data.

The communications port connects the robot control unit 42 with the teaching pendant 60, and is connected to the communications controller through a cable for serial communications.

The PCMCIA interface reads a robot operation program, a program relevant to an image processing and data on various parameters stored in the memory card, and writes operation program and various parameters stored in the DRAM, into the memory card.

The touch panel is arranged on the liquid crystal display in piles, so that touching an area for one of the items displayed on the liquid crystal display will enable a command for the item to be inputted. This inputting operation using such a touch panel is conventional one.

The key control circuit comprises a processor and a DMAC, and processes a signal from a jog key, an emergency stop key, a cursor key for processing an image, numerical keys (refer to FIG. 7), etc. The processor may directly conduct processing of the keys.

Figure 1:
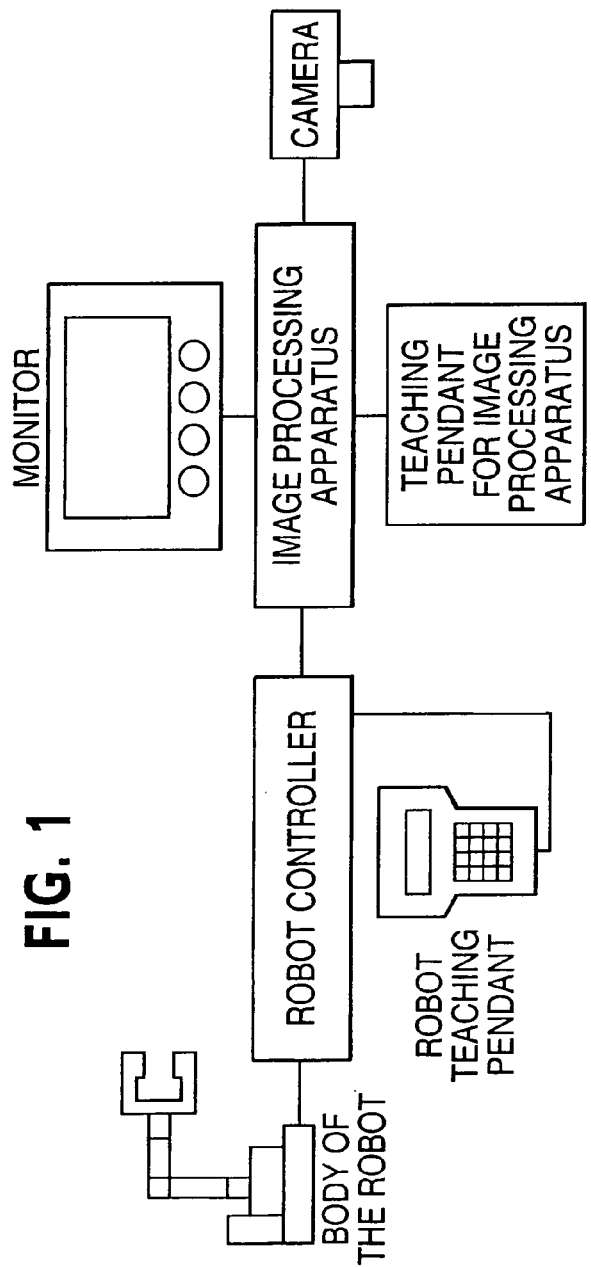
FIG. 1 is a schematic diagram of a first example of the image processing apparatus for a robot according to the conventional technology.
Figure 2:
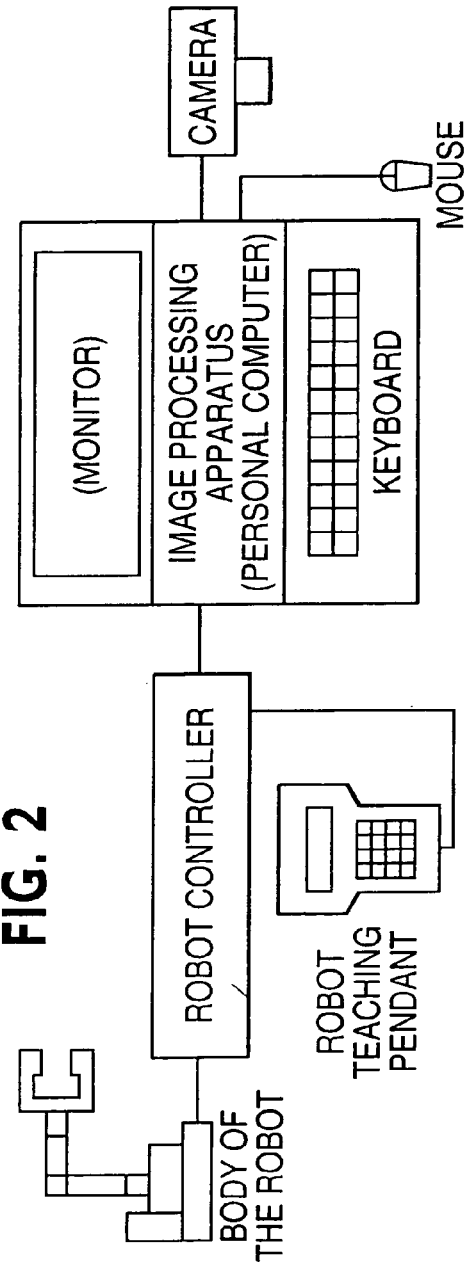
FIG. 2 is a schematic diagram of a second example of the image processing apparatus for a robot according to the conventional technology.
Figure 3:
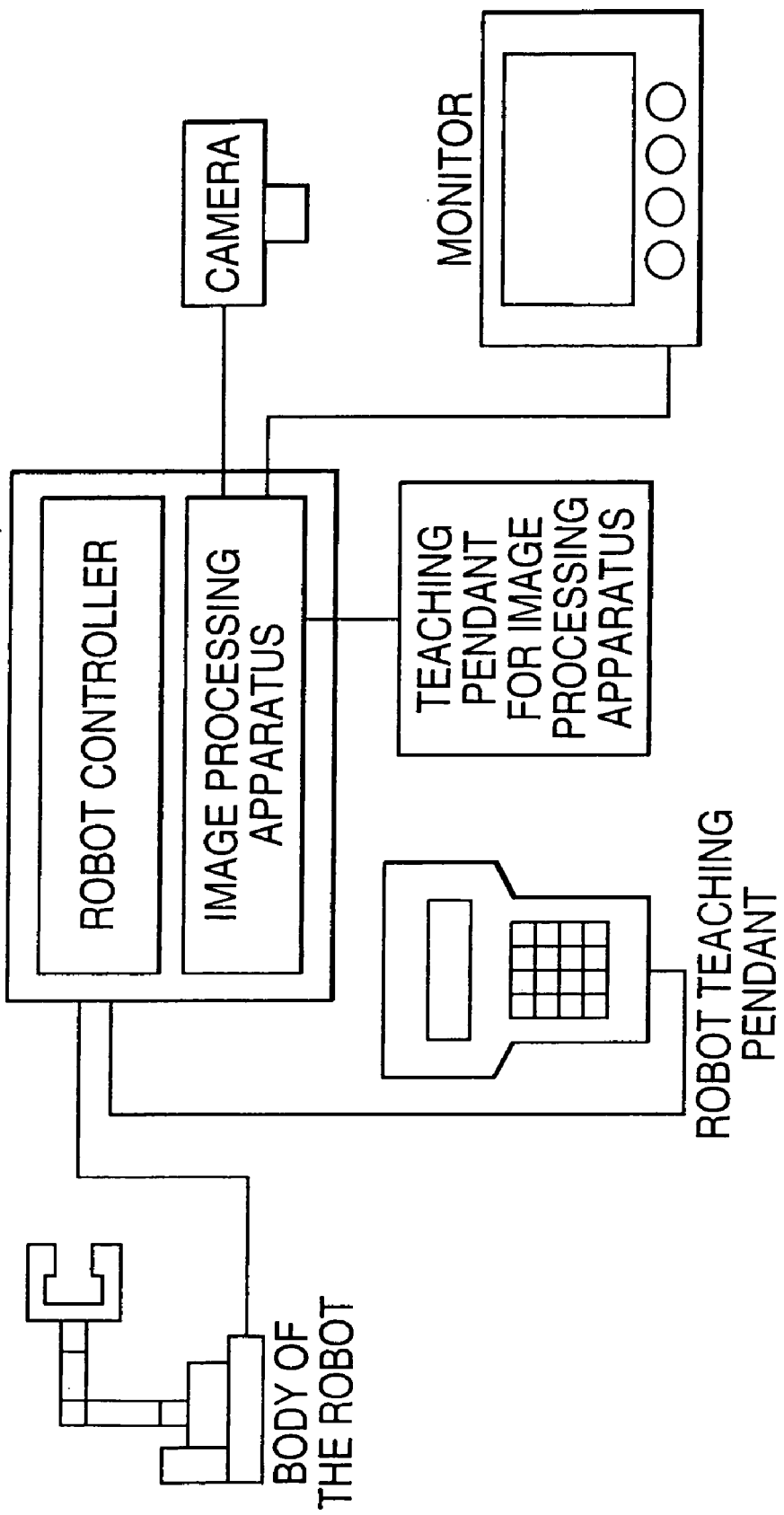
FIG. 3 is a schematic diagram of a third example of the image processing apparatus for a robot according to the conventional technology.
Figure 10:
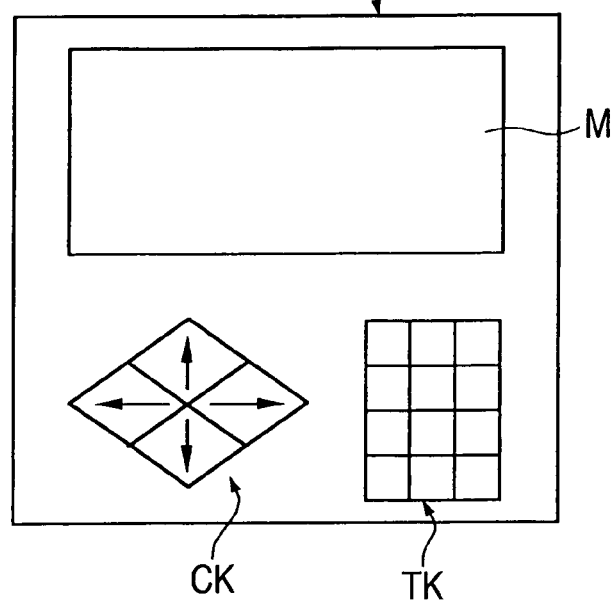
FIG. 10 is a schematic diagram of the front view of the first example of the teaching pendant connected to the image processing control apparatus shown in FIGS. 4 to 6.

An example of the teaching pendants 60 and 70 to be connected to the image processing control units 13 and 30, which can be used in the case of FIG. 4 (first embodiment) and FIG. 2 (second embodiment) will be described below by referring to FIG. 10. FIG. 10 shows a front view of the teaching pendants 60 and 70.

The teaching pendants 60 and 70 are provided with a cursor key CK, numerical keys TK, and a monitor display (TV or LCD) M as shown in FIG. 10, and performs manipulations relevant to image processing, displays image information, etc.

Figure 11:
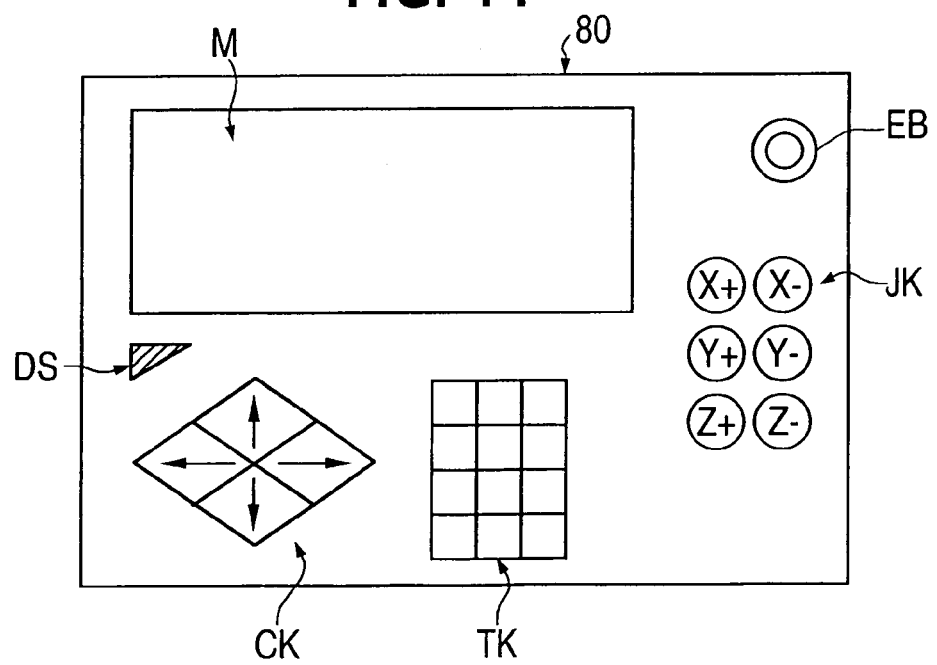
FIG. 11 is a schematic diagram of the front view of the second example of the teaching pendant connected to the image processing control apparatus shown in FIGS. 4 to 6.

Furthermore, an example of the teaching pendant 80 to be connected to the robot control unit 42, which can be used in the case of FIG. 6 (third embodiment) will be described below by referring to FIG. 11. FIG. 11 shows a front view of the teaching pendant 80.

The teaching pendant 80 is provided with not only a cursor key CK, numerical keys TK, a monitor display (TV or LCD) M but also an emergency stop button EB, a manual feed key JK, a deadman's switch DS, etc. as exclusive keys. This teaching pendant 80 serves both as a robot teaching pendant and a teaching pendant for the image processing apparatus (for operations relevant to image processing, displaying image information, etc.) The deadman's switch DS is used to unconditionally stop a robot when an operator stops pressing this switch, guaranteeing the safety of the operator when driving a robot.

Figure 12:
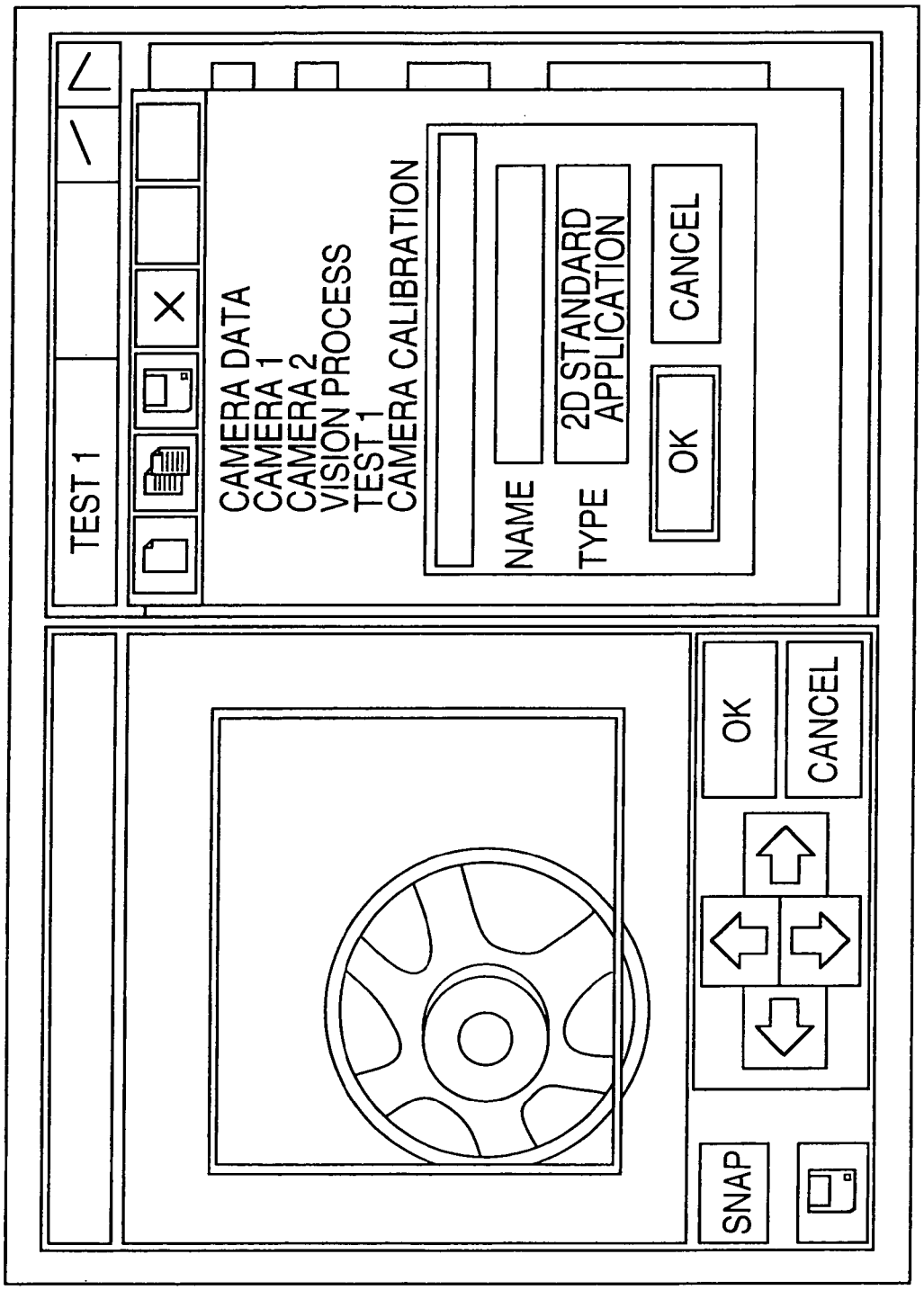
FIG. 12 shows an example of the contents displayed on the monitor screen of the teaching pendant shown in FIG. 10 or 11.

On the monitor display screen M, a robot operation menu, an image processing apparatus manipulating menu, image information, etc. can be displayed by operating the cursor key CK, the numerical keys 10, etc. FIG. 12 shows the state of displaying the image on the left of the monitor screen M and the operation menu of the image processing apparatus on the right. Switching to or from the robot operation menu is performed using a soft key provided on an outer frame (not shown) of the display unit. A touch panel is provided on the surface of the display unit of the teaching pendant, and the input information from the touch panel is transmitted to the console interface of a robot or the console interface of the image processing apparatus depending on the contents displayed on the touch panel.

The setup operation for starting work to be performed by using the image processing apparatus for a robot according to the present invention (first through third embodiments) will be described below by referring to the flowchart shown in FIG. 13. The above-mentioned work (application to be performed) involves recognizing the shift of the position of a target workpiece using a camera CM, adjusting and controlling the robot operation program, and performing the program.

First, a camera CM is set at a predetermined position of a cell (work area), and connected to a camera interface through a camera cable (step S11). The camera cable contains a picture signal line and a synchronous signal line. The power supply for driving the camera can be externally provided, or from the image processing apparatus by providing a power source line for the camera cable.

An item for display of a raw image from the camera is selected on the image processing apparatus menu of the teaching pendant. Then, a raw image of the gray scale of a camera is displayed on the teaching pendant. It is desired that a raw image is updated 30 times per second. However, the frequency of several times per second is acceptable as the minimal update frequency. It is also desired that the gray scale level of a displayed image is as high as the level of the image memory. For example, assuming that the image memory has 256 levels of a gray scale, the gray scale resolution can be lowered to 16 levels when an image is displayed on the teaching pendant.

Then, a target workpiece is placed at a predetermined position in the field of the vision of a camera, and the focalization, stop, and zoom of a lens are adjusted (step S12). At this time, the lens adjustment ring is operated to obtain an optimum state while watching the raw image displayed on the monitor screen of the teaching pendant. The adjustment ring is fixed in the optimum state so that the adjusted state of the lens does not change. This lens adjusting operation is easily performed with the configuration of the apparatus while watching the image near the target workpiece or the camera.

Then, information as to where in a robot coordinate system the field of the vision of a camera corresponds to (step S13) is set. This setting is referred to as camera calibration, wherein parameters for use in converting the position (in terms of number of pixels) of the target workpiece detected in the image into the position (in terms of millimeters) in the robot coordinate system are set. The camera calibration can be embodied in various methods, but in this example, the simplest system, that is, a two-point calibration system will be described below.

This system can be realized by setting two points in the field of the vision of a camera, and setting in the image processing apparatus the distance (mm) between the two points, the positions (pixels) of the two points in the image, and the position (X, Y) (mm) in the robot coordinate system. Values can be set and inputted on the image processing apparatus manipulating menu. To set the position in the image, an image containing two points is fetched to the image memory, and the position is specified on the displayed image.

Then, an application program is generated such that the image processing apparatus can recognize the position of a target workpiece, and various parameters of an image analyzing method are set (step S14). The application program is generated by the operation of the image processing apparatus operation menu of the teaching pendant. There are various image analyzing methods. In this example, a template matching method is used to set a template image of a target workpiece as a parameter. When the image is set, a target workpiece is specified by being encompassed by a rectangular window in the displayed image. The specified template image is stored in the data memory together with a detection threshold, an application program, etc.

If the image analyzing method is set, the target workpiece is moved within the field of the vision to confirm whether or not it can be correctly detected (step S15). When the target workpiece is moved to various positions in the field of the vision, a raw image from the camera is displayed on the teaching pendant. When a detection test is selected on the image processing apparatus manipulating menu, an image fetching unit stores an image from the camera in the image memory. Then, the image analyzing unit carries out matching check with the template image which has already been set, and detects the target workpiece. The detected position is displayed in the graphics of the image.

If it is confirmed that the target workpiece can be correctly detected, then a target workpiece can be placed at an appropriate reference position, and the position is set as a reference position in the image processing apparatus' (step S16). When the target workpiece is set, the raw image from the camera is displayed to support the target workpiece to be easily centered in the field of the vision. To set a position as a reference position, a reference position setting item is selected from the image processing apparatus manipulating menu. Then, as in the case of the above described test, an image is fetched and processed, and the target workpiece is detected. The detected position in the image is stored in the data memory as a value in the robot coordinate system using the camera calibration data which has already been set.

Furthermore, a robot handling operation to be performed on the target workpiece located at the reference position is indicated and set (step S17). When an operation is switched from setting of the image processing apparatus to setting of the robot, it is not necessary to switch operating units, but is necessary only to switch operation menus. The robot is manually operated by using an exclusive hard key of the teaching pendant, and indicates the handling operation.

Before starting the handling operation, a robot program is prepared such that an instruction to detect a target workpiece is issued to the image processing apparatus to wait for the completion of processing an image. A position adjustment instruction is added to the handling point and the points before and after the handling point so that the operation can be adjusted from the image processing apparatus.

Described above is the outline of the manipulations to be performed when an application is set up. The operation to be performed when the setup application is executed will be described below by referring to the flowchart shown in FIG. 14.

First, when a robot program is activated (step S21), an image process instruction in the robot program is executed, and the image processing apparatus is notified of the execution through the communications interface (step S22). The image processing apparatus fetches an image from the camera, and stores it in the image memory (step S23).

Then, an image analysis unit performs template matching, detects a target workpiece, and displays it on the monitor screen (step S24). The position of the detected target workpiece on the image is converted into the position in the robot coordinate system, and the amount of the shift of the position from the predetermined reference position of the target workpiece, which has been set in advance, is computed (step S25). The computed amount of the shift is transmitted to the robot through the communications interface, and the robot is notified of the completion of the image processing (step S26).

In addition, the detection result is drawn as graphics on the image information of the teaching pendant, and on the image information of an independently connected TV monitor. The maintainers of a production line can confirm at any time that the image processing apparatus is correctly working by watching the graphics.

When the robot receives the image process completion notification, it adjusts and controls the position using the transmitted data of the amount of the shift to handle the target workpiece (step S27).

As described above, since the image processing apparatus manipulating menu and the image information can be displayed on the portable teaching pendant for performing an manipulation relevant to an image processing according to the present invention, an operator can go close to a target workpiece or a camera, carrying the portable teaching pendant, and, performs an operation such as changing the position of the target workpiece as necessary, watching the image information displayed on the teaching pendant, or can perform manipulation of the image processing apparatus.

Furthermore, if the image processing apparatus can be built in the robot controller, and an image processing manipulation function and an image monitoring function are incorporated into a portable robot teaching pendant, then the operability of the system where a robot and an image processing apparatus are incorporated into one system can be further improved.

The invention claimed is:

1. An image processing system for a robot including a robot controller, comprising:
    a unit for fetching from a camera image data of an image of a workpiece to be worked on by the robot;
    a memory unit that stores image data from the camera or intermediate image data obtained in a stage of image processing; and
    a unit for converting image data from the camera, the image data from the camera stored in the memory unit, or intermediate image data into a gray scale or a color scale, wherein:
    a portable teaching pendant is connected to said robot controller through a cable; and
    said teaching pendant comprises a unit for generating and editing a robot program, a unit for operating the robot, and a display unit, and can display on the display unit the converted image, and comprises a unit used for manipulation for image processing; and
    said display unit displays an indication for generating or editing of the robot program and an indication for manipulation of image processing, together with an image simultaneously, or allows a user to select either a switching mode or a superposition mode.

2. The system according to claim 1, further comprising:
    a unit for displaying and superposing geometric graphics on the image displayed on the display unit in accordance with the operation procedure of the image processing and specifying an image processing with respect to the image.

3. The system according to claim 1, further comprising a unit for incorporating an instruction to process an image into a program of a robot.

4. The system according to claim 1, wherein a part of the operation unit of the teaching pendant is configured by a touch panel.

5. A method, comprising:
    fetching from a camera image data of an image of a workpiece to be worked on by a robot;
    storing image data from the camera or intermediate image data obtained in a stage of image processing; and
    converting image data from the camera, the image data from the camera stored in a memory, or the intermediate image data into a gray scale or a color scale; and
    displaying the converted image data on a teaching pendant used for generating, editing a robot program and used for operating said robot,
    wherein said displaying displays the image data and indication for manipulation for image processing simultaneously, or allows a user to enter a switching mode or a superposition mode.

6. An image processing system for a robot including a robot controller, comprising:
    a unit for fetching from a camera a visual image of a workpiece to be worked on by the robot;
    a memory unit that stores the visual image from the camera or obtained in a stage of image processing;
    a unit for converting the visual image into a gray scale or color scale visual image;
    a portable teaching pendant connected to said robot controller through a cable, said teaching pendant comprising:
        a unit for generating and editing a robot program,
        a unit for operating the robot, and
        a display unit that can display the gray scale or color scale visual image and an image processing manipulation menu; and
    an image processing unit used for image processing, wherein
    said display unit displays an indication for generating or editing of the robot program and an indication for manipulation of image processing, together with the gray scale or color scale visual image of the robot simultaneously and allows a user to select between using the pendant for image processing teaching and robot teaching/control.

* * * * *

UNITED STATES PATENT AND TRADEMARK OFFICE
CERTIFICATE OF CORRECTION

| | |
|---|---|
| PATENT NO. | : 7,151,848 B1 |
| APPLICATION NO. | : 09/429920 |
| DATED | : December 19, 2006 |
| INVENTOR(S) | : Atsushi Watanabe et al. |

Page 1 of 1

It is certified that error appears in the above-identified patent and that said Letters Patent is hereby corrected as shown below:

Column 10, Line 44, change " apparatus' " to --apparatus--.

Signed and Sealed this

First Day of May, 2007

JON W. DUDAS
*Director of the United States Patent and Trademark Office*